United States Patent [19]

Reh et al.

[11] 4,080,437
[45] Mar. 21, 1978

[54] PROCESS FOR THERMAL DECOMPOSITION OF ALUMINUM CHLORIDE HEXAHYDRATE

[75] Inventors: Lothar Reh, Frankfurt am Main; Ludolf Plass, Kronberg; Hans Werner Schmidt, Frankfurt am Main; Günter Schoene, Kelsterbach, all of Germany; Philippe Marchessaux, Aix en Provence, France

[73] Assignee: Aluminum Pechiney, Lyon, France

[21] Appl. No.: 688,124

[22] Filed: May 20, 1976

[30] Foreign Application Priority Data

Jun. 3, 1975   Germany ............................ 2524541

[51] Int. Cl.² ............................................. C01F 7/30
[52] U.S. Cl. .......................... 423/625; 423/DIG. 16; 423/481; 34/10; 34/11; 432/15; 23/262; 23/277 R; 23/284
[58] Field of Search ........... 423/625, 659 F, DIG. 16; 34/10, 11; 432/15

[56] References Cited

U.S. PATENT DOCUMENTS

| | | | |
|---|---|---|---|
| 2,539,263 | 1/1951 | Munday | 423/659 F |
| 2,780,525 | 2/1957 | Wendell et al. | 423/625 |
| 3,130,008 | 4/1964 | Stokes et al. | 423/625 |
| 3,144,303 | 8/1964 | Engelmann | 423/74 |
| 3,579,616 | 5/1971 | Reh et al. | 423/659 F |
| 3,648,380 | 3/1972 | Guilloud | 423/659 F |
| 3,754,993 | 8/1973 | Oguchi et al. | 423/659 F |
| 3,836,635 | 9/1974 | Reh et al. | 423/659 F |

FOREIGN PATENT DOCUMENTS

| | | | |
|---|---|---|---|
| 2,261,083 | 7/1974 | Germany | 423/625 |
| 38-1353 | 2/1961 | Japan | 423/625 |

OTHER PUBLICATIONS

Reh, "Chemical Engineering Progress", vol. 67, No. 2, 1971, pp. 58–63.

Primary Examiner—Herbert T. Carter
Attorney, Agent, or Firm—McDougall, Hersh & Scott

[57] ABSTRACT

Process for the thermal decomposition of aluminum chloride hexahydrate into anhydrous $Al_2O_3$, comprising predrying and then decomposition in a fluidization reactor, the said fluidization being ensured by recycled gaseous HCl, and finally heating at the temperature necessary to obtain the desired crystallization state, namely anhydrous $Al_2O_3$, the said pre-drying being carried out by the gases coming from this final heating.

17 Claims, 2 Drawing Figures

PROCESS FOR THERMAL DECOMPOSITION OF ALUMINUM CHLORIDE HEXAHYDRATE

The invention concerns a process for the thermal decomposition of aluminum chloride hexahydrate in a highly expanded state of fluidization, with a decrease in the concentration of solid material from the bottom to the top of a fluidization reactor and an outflow of the solid material with the gases at the upper part of this reactor, following which the solid material is separated from the gases and is reintroduced, at least in part, into the fluidization reactor. The material to be subjected to the process is pre-dehydrated and partially decomposed in at least one predrying exchanger and heated by the gases leaving the fluidization reactor, and is then reintroduced into the latter. The product formed by the reaction is let to a fluidization exchanger which uses a gas containing oxygen as fluidization gas; at least a part of the heated gas coming from this exchanger is introduced into the fluidization reactor as a secondary gas above the gas distributor, and the heat required to carry out the reaction is derived from a fuel which is added to the zone between the gas distributor and the inlet pipe for the secondary gas.

A conventional, so-called "fluidized bed" process is known for the thermal decomposition of aluminum chloride hexahydrate; in such a process there is a dense phase, often called a "fluidized bed", and above this a much less dense phase consisting of gas and powder in a dilute suspension in this gas. The density changes sharply at the boundary of these two phases (German Patent Application Nos. 1,667,195 and 2,261,083).

A process is also known in which there is a strongly expanded fluidized state (German Patent Application No. 1,767,628). In this process a layerless fluidization state, having a definite upper limit, is maintained by using a gas velocity which is clearly higher than necessary to maintain a conventional fluidized bed, the solid product would be quickly entrained by the gas and swept out of the reactor if the latter were not continuously supplied. The concentration of solid product is less than in a bed, but is clearly greater than in the space above this bed. There is no sudden transition between the density of a dense phase and that of a lighter phase above this dense phase, but in the interior of the reactor the concentration of solid material decreases progressively from the bottom to the top.

The process of German Patent Application No. 1,767,628 provides, in particular, a very high degree of recovery of the heat contained in the exhaust gases and in the solid material which is extracted. It is thus possible to obtain maximum utilization of the fuel, that is to say an optimum calorific yield. The combustion in two stages, namely, first of all incomplete combustion with only the fluidization gas in the region of high densities, and then combustion in the presence of secondary gas in an amount equal to or slightly greater than the amount corresponding to a complete combustion, prevents localized overheating of the fluidized mass. A very constant temperature may be obtained and accurately regulated.

Despite these great advantages, this known process has a disadvantage when it is used for the decomposition of aluminum chloride hexahydrate. For technical reasons connected with the reaction, for example on account of phase changes or when a high degree of purity is desired in the alumina produced, the minimum residence time of the alumina in the reaction system must be high. Of course, in the known process, this result may be obtained by increasing the height of the treatment furnace, but this also increases the pressure drop in the fluidized medium and, for the same reason, the energy consumption.

In order to obtain an increase in the average residence time, only two means are available; either, at a constant density of the suspension in the fluidized reactor, to reduce the production or output (with the same pressure drop) or, with constant production, to increase the density of the suspension, which is associated with a large increase in the pressure drop and in the recirculation of solid material much greater than the technically necessary amounts.

The aim of the present invention is to eliminate the disadvantages described above while preserving the advantages of the process just described, that is to say to obtain a high average residence time without having to provide, at the same time, any additional energy.

According to the present invention, this aim is achieved by operating the process described above in such a way that the solid material, separated from the gas, is introduced into a fluidizing residence reactor at a low gas velocity, a part stream of solid material is continuously recycled in a regulated amount into the fluidizing reactor hereinafter denoted by the term "turbulent reactor" in order to establish therein a specific suspension density, and the remainder of the solid material is led to a fluidizing cooler after a sufficiently long residence time in the system.

According to the invention, the central part of an apparatus for carrying out the process consists basically of a turbulent reactor and a residence reactor. The individual phases of the whole reaction are distributed between the two reactors in accordance with the technical requirements of the reaction. The main part of the heat requirements, necessary for the decomposition, is provided in the turbulent reactor. The attainment of the final quality of the product, which demands a relatively longer time for example on account of phase changes or diffusion processes and requires only a small input of heat, is then effected by virtue of a prolonged residence in the residence reactor.

Particles from 20 to 300 $\mu$, for example, corresponding to an average particle size of 50 $\mu$, are very rapidly heated and, on account of their large specific surface, react very rapidly so that in the majority of cases 90% of the toal reaction has already occurred during the first passage through the turbulent reactor. The reaction then effectively comes to an end in the residence reactor, using both the product and the apparatus to the best advantage.

The process according to the invention combines the possibility of an intensive production of heat in the turbulent reactor and the advantages of a flexible combustion, with a value which is very close to the stoichiometric value because it is in two stages. The disadvantages resulting from the residence time requirements mentioned above are avoided by introducing solid materials separate from gases into the residence reactor, from where as much solid material is recylced as is necessary to regulate the density of the suspension in the turbulent reactor, and, also, to avoid temperature differences in the whole turbulent reactor-residence reactor system.

The operating conditions in the turbulent reactor and for the extraction of solid material outside the residence reactor are preferably selected, taking into account the amount of chloride newly introduced, so that the average density of the suspension in the zone situated between the gas distributor and the secondary gas inlet has a value between 20 and 300 kg/m$^3$, and in the zone above the secondary gas inlet pipe has a value between 1 and 20 kg/m$^3$.

Under the conditions specified above, the turbulent reactor has a pressure loss of about 250 to 900 mm of water.

From the definition of the operating conditions for the turbulent reactor, we obtain the following limits for the characteristic Froude and Archimedes numbers:

$$0.1 < \frac{3}{4} \cdot Fr^2 \cdot \frac{P_g}{P_k - P_g} < 10$$

and/or  $0.1 < Ar < 100$ where $$Ar = \frac{d_k \cdot g(P_k - P_g)}{P_g \cdot V^2}$$

wherein the symbols have the following meanings:
Fr — Froude's number
Ar — Archimedes' number
Pg — density fo the gases in kg/m$^3$
g — gravitational constant in m/sec$^2$
Pk — density of the solid particle in kg/m$^3$
$d_k$ — diameter of the spherical particle in m
V — kinematic viscosity in m$^2$/sec The suspension density in the residence reactor is, on the other hand, clearly higher on account of the low velocity of the fluidization gas, which should only basically ensure that the solid material is agitated (homogenized). In order to fully utilize the residence reactor, the suspension density should be greater than 600 kg/m$^3$.

As regards the Froude and Archimedes' numbers, it follows that:
the range of Archimedes' number is the same for the turbulent reactor, and
Froude's number satisfies the condition:

$$\tfrac{3}{4} \cdot Fr^2 \cdot \frac{P_g}{P_k - P_g} < 5.10^{-3}$$

The relative dimensions of the turbulent reactor and the residence reactor are essentially determined by the average residence time necessary in order to obtain a product of specific quality. In general, it is advantageous to adopt the rule that the average residence time of the solid materials in the turbulent reactor is between 10 and 30 minutes, and is 2 to 10 times greater in the residence reactor.

In the definition of the average residence time in the turbulent reactor, the flowrate of solid material recycled from the residence reactor is also taken into account, and this may be calculated from the sum of the average suspension densities in the two reactors referred to the hourly flowrate of product.

The choice of the fluidization gas and secondary gas flowrates, but especially the distribution of the two gas streams and the level of introduction of the secondary gas, provide additional possibilities of regulation.

In another variant of the invention, the secondary gas is introduced at a level which is situated between 1/10 and ⅓ of the total height of the turbulent reactor. The ratio of the amount of secondary gas introduced into the turbulent reactor to the amount of fluidization gas is carefully chosen to be between 10 and 1/1.

If, in order to regulate the necessary suspension density in the turbulent reactor, it appears necessary to restrict the recycling of the product from the residence reactor to a low value while however maintaining a relatively long total residence time, it is sensible to heat the product in the residence reactor by direct injection of fuel. The recycling does not serve to compensate for heat losses from the residence reactor, for example by radiation, but only serves to provide a more accurate control.

In the case of a particularly moist starting product, in order to regulate the temperature of the exiting gases, it may be advantageous to introduce the material into the turbulent reactor partly directly and partly indirectly after being heated by the stream of exiting gas. By means of a suitable distribution, one may for example establish an advantageous temperature in the purification plant for the exiting gas and avoid dropping below the dew-point.

In order to obtain an efficient thermal yield, according to another advantageous variant of the invention, the stream of solid particles leaving is cooled in a fluidizing exchanger comprising several chambers which are traversed in series. Furthermore, this exchanger may be equipped with elements within the chambers, in which fluidization gas can circulate and thus be heated before being introduced into the turbulent and/or residence reactors.

The amounts of gas passed into the reactors are carefully chosen so that the gas velocity in the turbulent reactor is between 3 and 15 m/sec, preferably between 4 and 10 m/sec, and in the residence reactor is between 0.1 and 0.3 m/sec, these velocities referring in each case to the empty reactor, under normal conditions of temperature and pressure.

The operating temperatures may be selected from a very wide range, and the quality of the product to be obtained is the main factor taken into consideration. They may range approximately between 650° and 1050° C.

Air may be used as fluidization gas and secondary gas, the gas in each case containing oxygen. In order to obtain a high concentration of hydrochloric acid in the exiting gas, it is advantageous to use oxygen-rich gases as fluidization gas and secondary gas, preferably gases with oxygen contents of up to 70% by volume.

Before the HCl, in the gases leaving the predrying exchanger, is absorbed, entrained solid materials are carefully removed from the said gases, for example by means of an electrofilter or a venturi scrubber. However, the solid product separated or that which is separated in the scrubber may be reintroduced into the turbulent reactor.

The invention is dealt with in more detail hereinafter, with the aid of the figures and the example.

Figure 1:
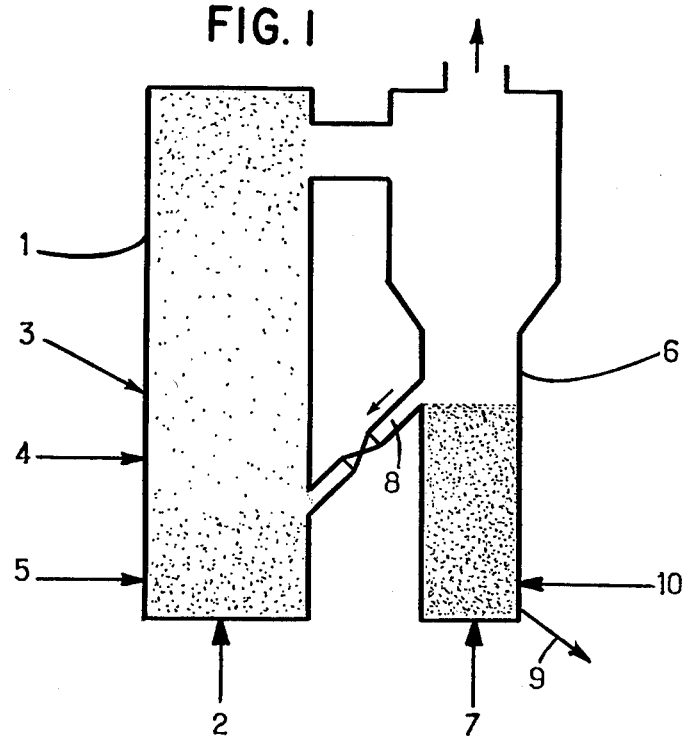
FIG. 1 is a diagrammatic representation of the part constituting the essence of the process, and comprising a turbulent reactor and a residence reactor.

According to FIG. 1, the fluidization gas and the preheated material are introduced into the turbulent reactor 1 and 2 and 3 respectively. The secondary gas is introduced at 4, and the fuel at 5. The solid material and the hot gases leaving the reactor 1 are separated in the upper part of the residence reactor 6; the solid material descends toward the lower part of reactor 6, which is slightly fluidized by gas via 7. The regulated recycling of solid material into the reactor 1 is carried out by the pipe 8; the finished product leaves via the extraction device 9. A pipe 10 enables fuel to be introduced for the purpose of any possible additional heating of the residence reactor 6 which may be necessary.

Figure 2:
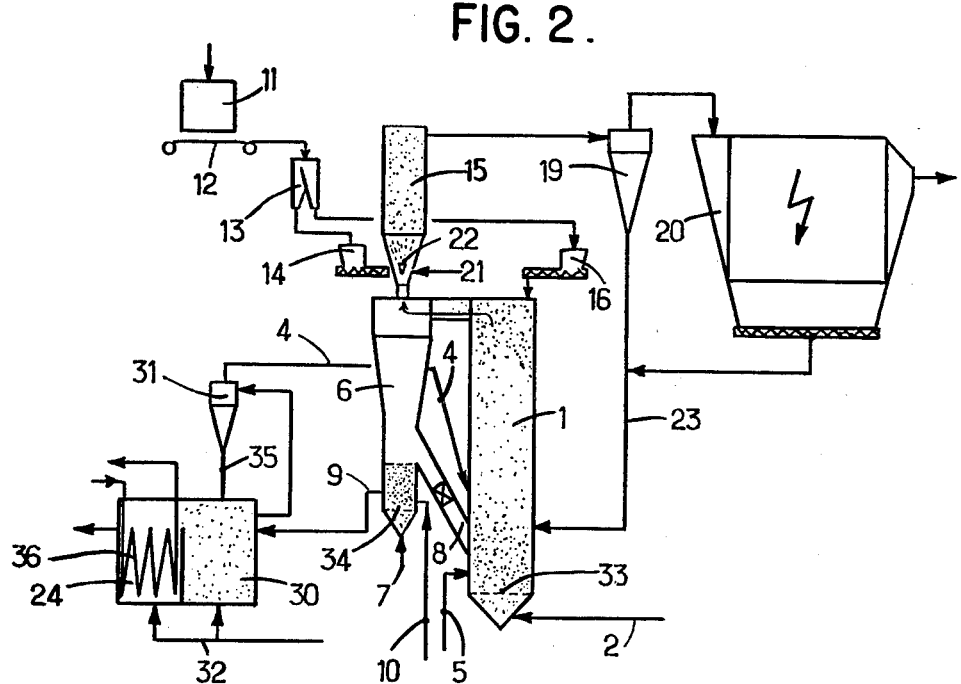
FIG. 2 is a diagram of a recommended method for carrying out the process.

In the diagram of FIG. 2, moist aluminum chloride hydrate contained in a feed hopper 11 is carried by a metering belt 12, for passage through a regulable distribution chute 13 and then through the inlet device 14, and is finally introduced into a predrying exchanger 15, for example a venturi drier, where it is entrained and heated by the gases leaving the turbulent reactor 1.

On account of the heat in the exiting gases, the HCl impregnation liquor evaporates and the chloride partially decomposes.

The predried and partially decomposed chloride is entrained by the gases leaving the predrying exchanger 15 and is separated in at least one dust removal cyclone 19. The removal of dust from the gases is carried out in a suitable apparatus 20, for example an electrofilter (electric precipitator). The dust-free gas leaves the plant at the exit of the filter and is passed to an absorption device, not shown.

In order to avoid overheating of the gas removal system in the event of a failure or breakdown, water or a solution of hydrochloric acid may be injected automatically via 21 and 22 into the preheater 15.

The solid material, separated in the dust removal cyclone 19, is led via the pipe 23 to the turbulent reactor 1. The solid material recovered in the electrofilter 20 is collected and also conveyed via the return pipe 23.

The predried and already partly decomposed product is introduced into the turbulent reactor 1. The amount of heat necessary to decompose the chloride and calcine the alumina formed is supplied via 5 by means of injectors, not shown, which introduce the fuel directly into the fluidized medium. A liquid fuel, such as fuel-oil or a combustible gas, may be used as fuel.

The combustion gas and fluidization gas necessary for the operation of the turbulent reactor are introduced in part as fluidization gas via 2 below the gas distributor 33, and in part as secondary gas via 4 above this same gas distributor.

The material entrained by the stream of hot gases produced by the combustion is separated from these gases in the upper part of the residence reactor 6 and then arrives at the lower zone of the latter. To fluidize this zone, an amount of fluidization gas as small as possible, introduced via 7 is used. If necessary, a small additional amount of fuel may be added via 10, above the gas distributor 34. On account of the long residence time at a high temperature and the very low degree of fluidization in the residence reactor 6, the result is that: with a long total residence time aluminum oxide having a very low residual chlorine content is produced, and only the amount of solid material necessary to maintain the desired fluidized state in the lower part of the reactor 1 is recycled.

The hot gases coming from the turbulent reactor 1 via the residence reactor 6 are directed to the preheating exchanger 15 where they perform the previously described function.

In order to avoid corrosion by condensed hydrochloric acid, care is taken to see that the temperatures of the walls of the apparatus are above 200° C by suitably choosing the lagging for the installation and the temperature in the preheater 15 and in the whole gas removal system.

A part of the solid material is led from the reactor 6 via the pipe 8 into the reactor 1, and a part is extracted by the metering device 9. The extracted part is passed to an exchanger 30 which is fluidized with an oxygen containing gas supplied by the pipe 32. In the case where a part of the products is entrained by the heated gases, these are separated in the cyclone 31 and reintroduced into the exchanger via the pipe 35. The heated gas is led, as secondary gas, via the pipe 4 into the turbulent reactor 1.

If a lower outlet temperature is desired for the solid, the latter can pass into a second exchanger 24.

In order to regulate the temperature in the turbulent reactor 1, widely varying amounts of chloride may be introduced therein by suitably regulating the distributor 13 so as to enable a part of the starting product to be introduced into the reactor 1 via the direct feed device 16.

On account of the good mixing and the intensive heat exchange between solid material and combustion gas, a uniform calcination temperature is established throughout the system formed by the reactor 1 and the reactor 6. As a result of the distribution of the gas flow rates, a turbulent zone having a high concentration of solid material is established in the zone between the gas distributor and the secondary gas inflow into the reactor 1. In the top part of the reactor, the concentration of solid materials descends with the result that the suspension entering the residence reactor 6 has a relatively low density.

EXAMPLE

An installation was used comprising:
a reactor 1 having an internal diameter of 1.3 m and an internal height of 10 m.
a residence reactor 6 whose lower region as far as the recycle pipe 8 has an internal diameter of 0.8 m and an internal height of 2 m.
a finished product cooler consisting of two chambers 30 and 24 in series.

The pipe 4 for the introduction of the secondary gas into the reactor 1 is situated at a height of 2 m; the pipe 5 for the introduction of fuel is situated at a height 0.30 m above the gas distributor 33.

The feed hopper 11 delivers 4.7 tons/hour of moist chloride hexahydrate via the metering belt 12 and the distribution chute 13. The particles of this chloride had an average diameter of 150 $\mu$, 50% of the particles having a larger diameter and 50% a smaller diameter. The product was distributed so that about 70% passed via the feed device 14 into the exchanger 15, and about 30% passed directly into the reactor 1.

The temperature in the venturi drier 15 was about 250° C as a result of mixing with the hot gas streams at 850° C coming from the upper part of the reactor 6. At the outlet of this preheater, all the moisture had evaporated and the chloride had been partially decomposed. Practically all the solid material entrained by the gas was separated in the cyclone 19; the separated material being passed into the reactor 1 via the recycle pipe 23. The final purification of the exiting gases was carried out at 20. The dust and powder which had been removed was also passed to the recycle pipe 23. The temperature of the hydrogen chloride-containing, exiting gases was above the dew-point of HCl.

756 $Nm^3$ per hour of cold air for the fluidization were introduced via 2 below the gas distributor 33 of the reactor 1. 3025 $Nm^3$/hour of air, preheated to 250° C in the heat exchanger 30, were introduced as secondary air into the reactor 1 via the pipe 4. The volume ratio of the amount of secondary air to the amount of fluidization air for the reactor 1 was 4.

In order to supply the heat requirements, 305 kg/hour of heavy fuel-oil were introduced into the space between the gas distributor 33 and the secondary gas pipe 4. The combustion of fuel-oil was incomplete in this zone. There was complete combustion above the secondary gas pipe 4. A uniform temperature of 850° C was established by the circulation of the solid material in the reactor 1 itself and by recycling solid material coming from the reactor 6.

In the upper part of the reactor 6, the solid materials leaving the reactor 1 were separated from the gas stream, and passed downwardly into the lower part and formed a fluidized bed. 80 Nm³/hour of air were passed in below the gas distributor of the reactor 6 in order to maintain the material in a dense fluidized layer state.

For an average residence time of about 2.2 hours for the solid material in the whole system, a distribution ratio of 0.5 to 1 was established between the amounts of material present in the turbulent reactor 1 and the residence reactor 6. The pressure loss in the reactor 1 was adjusted to about 400 l mm of water. The suspension density in the zone between the gas distributor and the secondary gas pipe 4 was about 200 kg/m³, in the zone above the secondary gas pipe 4 was 10 kg/m³, and in the lower part of the residence reactor was about 650 kg/m³.

The output, in an amount of 900 kg/hour of Al₂O₃, was removed from the reactor 6 by means of the extraction device 9 and introduced into the heat exchanger 30.

A non-expanded fluidized layer was produced in the said exchanger 30 by fluidization with 3025 Nm³/hour of cold air. The air heated therein up to 250° C and was then passed as secondary air to the reactor 1, via the pipe 4. In the exchanger 24, the aluminum oxide was cooled to about 80° C by the condenser 36 through which cooling water was circulated.

We claim:

1. A process for the thermal decomposition of aluminum chloride hexahydrate into anhydrous Al₂O₃ comprising:
   (1) continuously introducing the aluminum chloride hexahydrate into a turbulent reaction zone;
   (2) continuously introducing an amount of gas below a gas distributor in the turbulent reaction zone to maintain the solid material above the distributor in a fluidized state with a decrease in the concentration of solid material from the bottom to the top of said turbulent reaction zone;
   (2') continuously introducing a secondary gas into the turbulent reaction zone at a level above the gas distributor;
   (3) continuously extracting the solid material with the gas from the upper portion of the turbulent reaction zone;
   (4) continuously separating the solid material from the gas extracted from the upper portion of the turbulent reaction zone;
   (5) continuously feeding the separated solid material to a residence reaction zone which is operatively connected and maintained separate and apart from the turbulent reaction zone;
   (6) continuously introducing gases into the residence reaction zone in an amount sufficient to maintain the solid material in a fluidized state;
   (7) continuously recycling a portion of the solid material from the residence reaction zone downwardly to an intermediate portion of the turbulent reaction zone;
   (8) extracting a portion of the solid material from the residence zone as product; and
   (9) maintaining the suspension density in the turbulent reaction zone in the area between the gas distributor and the secondary gas inlet at an average of 20–300 kg/m³ inlet to a value between 1 and 20 kg/m² and maintaining the suspension density in the reaction zone at an average greater than 600 kg/m³.

2. A process as claimed in claim 1 which includes the step of predehydrating and partially decomposing the aluminum chloride hexahydrate prior to introduction into the turbulent reaction zone by passing the aluminum chloride hexahydrate in heat exchange with hot gases extracted from the turbulent reaction zone.

3. A process as claimed in claim 2 in which the heat exchange between the aluminum chloride hexahydrate and the hot gases extracted from the turbulent reaction zone is carried out by passage in heat exchange through a predrying exchanger.

4. A process as claimed in claim 3 which includes the step of purifying the gases leaving the predrying exchanger by an electrofilter, and recycling the separated solid material.

5. A process as claimed in claim 3 which includes the step of purifying the gases leaving the predrying exchanger by a venturi scrubber, and recycling the separated solid material.

6. A process as claimed in claim 1 which includes the step of processing the solid material extracted from the turbulent reaction zone in steps 3 and 4 through a fluidized heat exchanger before introduction into the residence reaction zone of step 5.

7. A process as claimed in claim 6 in which at least part of the gas from the fluidized exchanger is introduced as secondary gas into the turbulent reaction zone at a point above the distributor for the gases introduced for fluidization.

8. A process as claimed in claim 7 in which the secondary gas is introduced at a level between 10% to 30% of the height of the turbulent reaction zone extending above the gas distributor.

9. A process as claimed in claim 7 in which the ratio of the amount of secondary gas added to the turbulent reaction zone to the amount of fluidization gas is between 10 and 1.

10. A process as claimed in claim 1 which includes the step of introducing fuel into the turbulent reaction zone at a point between the gas distributor and the point of introduction of secondary gas and in an amount sufficient to carry out the reaction.

11. A process as claimed in claim 1 in which the average passage time of the solid material in the turbulent reaction zone is regulated to be between 10 and 30 minutes.

12. A process as claimed in claim 1 in which the average time of the solid material in the residence reaction zone is regulated to be 2 to 10 times the time in the turbulent reaction zone.

13. A process as claimed in claim 1 which includes the step of heating the residence reactor.

14. A process as claimed in claim 1 in which the material to be processed is introduced in part directly and in part indirectly after heat exchange with hot exhaust gases from the turbulent reactor.

15. A process as claimed in claim 1 which includes the step of cooling the extracted solid material in an exchanger having several chambers in series.

16. A process as claimed in claim 1 in which oxygen-rich gases are used as at least one of the gases including the fluidization gas and secondary gas.

17. A process as claimed in claim 16 in which the oxygen content of the oxygen-rich gas is up to 70% by weight.

* * * * *

UNITED STATES PATENT OFFICE
CERTIFICATE OF CORRECTION

Patent No. 4,080,437   Dated March 21, 1978

Inventor(s) Luther Reh et al

It is certified that error appears in the above-identified patent and that said Letters Patent are hereby corrected as shown below:

Col. 8, line 10, before "inlet" insert -- maintaining the suspension density in the zone above the"

Signed and Sealed this

Twelfth Day of September 1978

[SEAL]

Attest:

RUTH C. MASON
*Attesting Officer*

DONALD W. BANNER
*Commissioner of Patents and Trademarks*